Nov. 26, 1929.　　　R. A. McDONALD　　　1,737,319

AIR TIGHT LINER FOR EGG CRATES

Filed Oct. 30, 1925

Inventor
Richard A. McDonald
By his Attorneys
Edwards, Sager & Bower

Patented Nov. 26, 1929

1,737,319

UNITED STATES PATENT OFFICE

RICHARD A. McDONALD, OF OAKLAND, CALIFORNIA, ASSIGNOR TO WESTERN WAXED PAPER COMPANY, OF OAKLAND, CALIFORNIA

AIR-TIGHT LINER FOR EGG CRATES

Application filed October 30, 1925. Serial No. 65,724.

This invention relates to means for and a method of packing and sealing articles in a substantially air-tight manner, the invention being particularly adapted to seal eggs within an air-tight liner that is disposed within a usual egg crate.

In the shipment, handling or storage of eggs it is undesirable to allow loss of moisture therefrom for the reason that otherwise deterioration sets in more rapidly than if contained within an air-tight chamber. It will, of course, be apparent that in the storage of eggs a suitable warehouse room might be provided, but when the eggs are in transit and transferred from one point to another the means for retaining the eggs in a substantially air-tight condition must be embodied with the egg crate during packing. It is accordingly an object of my invention to provide a liner disposable in an egg crate and within which the eggs may be disposed. Due to the eggs being fragile a usual type of egg support will be disposed within the liner, this support as usual keeping the eggs properly separated both vertically and horizontally. The usual construction of these supports is in having a series of vertical strips disposed at right angles to each other, thereby forming individual compartments for the eggs. Each set of angularly disposed strips are separated by horizontal members. As is well known, all of these members are sometimes made of cardboard or for more permanent construction could be made of wire, wood or the like. After the eggs are properly placed in their individual compartments the top portions of my liner will be folded over and then sealed. Due to the interior egg supporting structure the top flap portions of my liner can be more securely pressed together to effect sealing and if a flat piece of cardboard or the like should be placed over the top layer of eggs it will be seen that a substantially uniform surface would be provided, thereby more positively insuring a perfect seal of the liner. It will thus be seen that I have provided an improved combination of elements in an egg crate which cooperate with each other to produce a single result, namely, of supporting and sealing the eggs.

This cooperation is seen by considering that the inner framework for the eggs supports the eggs and directly cooperates with the liner by forming a support upon which the flaps can be pressed during the sealing operation. Thus by my improved construction the inner framework is made to perform two functions, whereas previously it had only performed one, namely, of supporting the eggs.

It is a further object of my invention to provide an improved blank for forming the liner element, while a further object is to provide an improved method of packing and sealing the crate. From the above it will be seen that certain predetermined steps are taken in the packing and sealing of the egg crate.

It will, of course, be clear that articles other than eggs might be packed and sealed, which articles are in what might be termed a lump form in distinction to those things which are powdered or relatively small in size. In articles of this type, such as ground coffee, it is usual to place the same within a waxed container but it will, of course, be obvious that in folding over the flaps of such container a substantially uniform surface will be provided, for the reason that the ground coffee will yield considerably when the flaps are pressed thereon. Thus, the sealing and packing of such articles does not involve the problems that are present in the packing of such things particularly as eggs, which are fragile.

Other objects of my invention, which consists in the novel arrangement of parts and improved combination of elements, will be seen from the following description of the invention as illustrated in the accompanying drawings, wherein Fig. 1 is a perspective of an egg crate partly broken away to show my invention embodied therein.

Figure 1:
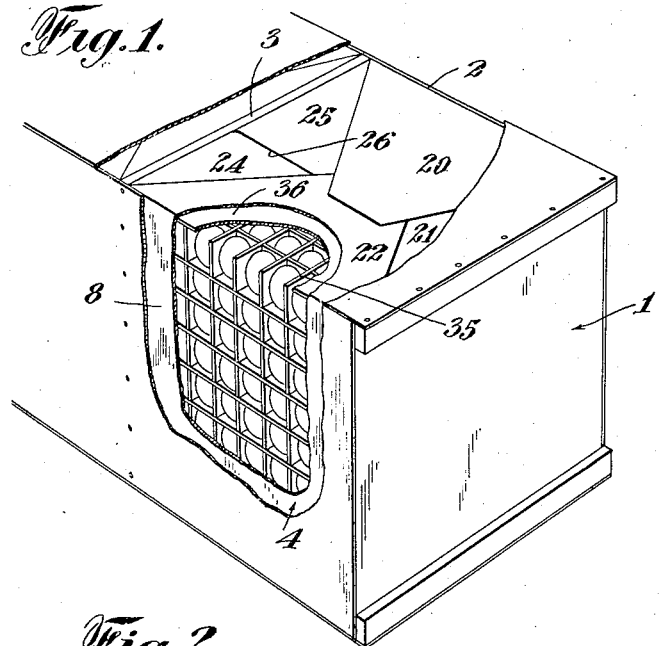
Figure 2:
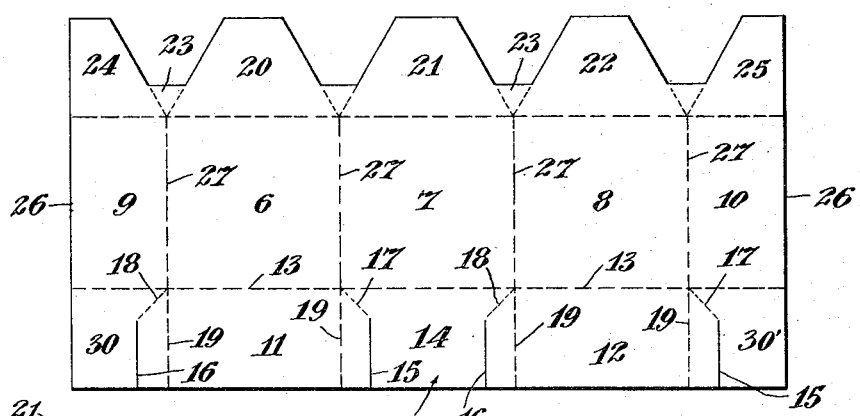
Fig. 2 is a plan view of a liner blank.

In the illustrative embodiment of my invention as shown an egg crate 1 has a compartment 2, which forms one of usually two compartments of an egg crate. Disposed within each compartment and supported by the crate walls including the transverse wall 3, which separates the compartments is a liner 4. This liner comprises in blank form a substantially rectangular piece of paper, preferably waxed or made of suitable air or moisture resisting material. This blank 5 is divided into substantially three full sections, 6, 7 and 8 and two half sections, 9 and 10. The sections 6 and 8 have portions 11 and 12, which will fold along the lines 13, 17, 18 and 19 to form the inner bottom portion of the liner. The section 7 has a portion 14 separated from the portions 11 and 12 by being cut as at 15 and 16. The portion 14 folds along the line 13 and also along the lines 17 and 18 to form the outside of the liner bottom. The bottom portions will be sealed as by gluing or by the use of other suitable means. The portions 9 and 10 together form a section similar to the section 7. The sections 6, 7 and 8 each have flap cover portions 20, 21 and 22 separated by an opening of preferably V-shaped formation and joined at their corners by web portions 23. The portions 9 and 10 each have flap cover portions 24 and 25, which together form a section similar to any one of the sections 20—22. Thus, one or the other of the sections 9 or 10 will be slightly wider than the other to permit an overlapping thereof for sealing purposes.

Figure 3:
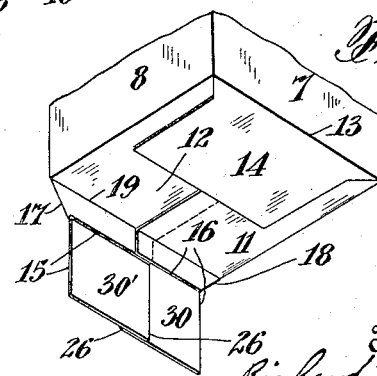
Fig. 3 is a fragmentary perspective of the bottom of the liner in the process of being folded.

The assembling of this blank consists in first gluing the sections 9 and 10 adjacent their vertical edges 26. Each section will then be folded along vertical lines 27, thereby forming the corners of the liner. The portions 11 and 12 will be folded inwardly so that various portions will lie upon each other, as indicated by the showing of the liner in Fig. 3. With the two portions 11 and 12 folded in, the portions 30 and 30' of the sections 9 and 10 and the portion 14 of the section 7 can then be folded and glued to the outer surface of the portions 11 and 12. The liner may then be inserted within the crate and the eggs then packed, as by inserting a series of the usual egg supports 35 which has the usual individual egg compartments. The upper cover or flap portions upon completion of the packing may then be folded over the last of the egg supports 35. These supports are of sufficient rigidity to permit pressure to be applied to the various overlapping portions so that the same may be sealed, and it will be apparent that if desired a top cover plate 36 may be placed over the top of the uppermost of the supports 35, thereby providing a substantially uniform surface. With a cover plate the various contacting surfaces of the flaps may be more securely and uniformly glued and accordingly made more air-tight.

Figure 4:
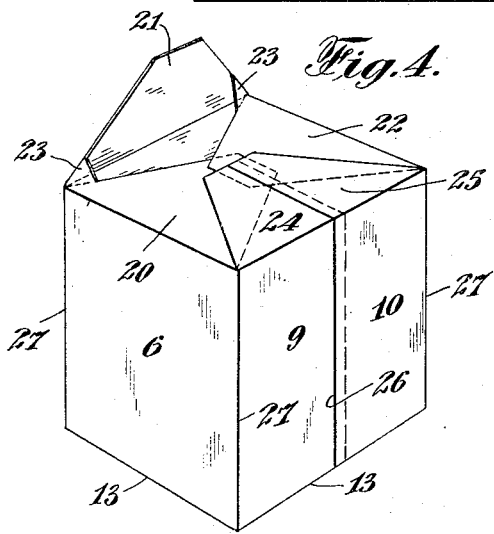
Fig. 4 is a perspective of the liner removed from the crate and showing all but one of its cover flaps in sealing position.

The particular mode by which the flaps 20, 21 and 22, 24 and 25 are folded is thought to be apparent from Fig. 4 wherein it will be noted that the portions 23 will form a substantial sealing area adjacent each corner of the liner.

From the above it will be seen that my invention aside from the structural features includes a method of packing the box, particularly an egg crate, and consists of first inserting a liner, next inserting an inner support for the articles, then if desired, placing a cover on the supports to provide a uniform surface for sealing purposes, and finally overlapping the various cover flaps and sealing the same by using the inner supporting members for resisting sealing pressure. It is, of course, clear that this process could be carried out by hand or machine.

The angles and dimensions of the various lines and parts relative to each other are such that there will be no wrinkling of the liner and will provide ample overlapping surfaces so that an air-tight seal may be effected.

It will be seen that the walls of the crate form a primary support for the liner while the inner egg supporting structure forms a secondary liner support. Also should articles other than eggs be packed, such as fruit or the like, and which would not need a secondary support but which would present an irregular upper surface, a flat piece of cardboard or the like similar to the member 36 could be placed directly on the top of the articles, thereby forming a substantially uniform and flat surface upon which the flap covers would be pressed during the sealing operation. The member 36 can be of any suitable shape to accomplish its intended function. The usual crate cover will be applied after the sealing operation.

It will, of course, be clear that various modifications of my invention may be had without departing from the spirit of the same, as set forth in the accompanying claims.

I claim:

1. A liner blank having side and flap cover portions, said flaps being of the type adapted to be sealed by pressure and of such length as to overlap each other when in normal folded relation and having when the liner is in flattened blank form opposing edges which are spaced apart to form a substantial sized opening therebetween, and web portions disposed between the adjacent corners of said flaps and substantially at the bottom of said opening whereby when said flaps are folded over each other a substantial sealing area will be had between said flaps and the corners of the sides of said liner while the remaining portion of the overlapping flaps will include only a single thickness of each flap, said sides and flaps being so arranged that said flaps may retain their flattened shape while being folded over each other.

2. The combination as set forth in claim 1 further characterized by having said opening substantially V-shaped.

RICHARD A. McDONALD.